United States Patent [19]
Lin et al.

[11] Patent Number: 5,241,647
[45] Date of Patent: Aug. 31, 1993

[54] METHOD OF ESTABLISHING A CLOCK IN THE I/O CARD OF A PERSONAL COMPUTER

[75] Inventors: James J. Y. Lin; Wen-Chin Pun; Wei-Hsiung Chuang; Yao-Sung Yang, all of Hsinchu, Taiwan

[73] Assignee: Winbond Electronics Corp., Hsinchu, Taiwan

[21] Appl. No.: 964,754

[22] Filed: Oct. 22, 1992

Related U.S. Application Data

[63] Continuation of Ser. No. 416,664, Oct. 3, 1989, abandoned.

[51] Int. Cl.[5] .............................. G06F 1/04; G06F 1/08
[52] U.S. Cl. .............................. 395/550; 364/DIG. 2; 364/950; 364/950.4; 364/950.5; 364/270; 364/271.5; 364/271.9
[58] Field of Search ................... 364/DIG. 1, DIG. 2; 395/275, 325, 500, 550, 700, 800

[56] References Cited

U.S. PATENT DOCUMENTS 4,204,206  5/1980  Bakula et al. ...................... 340/721
4,761,735  8/1988  Amy ................................... 364/200

OTHER PUBLICATIONS

John Uffenbeck, "Microcomputers and Microprocessors: The 8080, 8085, and Z-80 Programming, Interfacing, and Troubleshooting", printed by Prentice-Hall, Inc. Englewood Cliffs, New Jersey, ISBN 0-13-5803-09-8 01 (1985) pp. 410-413.

*Primary Examiner*—Robert B. Harrell
*Attorney, Agent, or Firm*—Harness, Dickey & Pierce

[57] ABSTRACT

A method of establishing a clock for the UART circuit provided in a standard I/O card or a combined graphic and I/O card is disclosed. The essential step of the method of the invention is to directly impress the clock of the main board of a personal computer into the UART circuit of the I/O card thereby eliminating the need for an independent crystal for the UART circuit. In an alternative embodiment of the method according to the present invention, the clock for the graphic data processing circuit provided in a combined graphic and I/O card is impressed directly to the UART circuit provided in the same card. The method of establishing a clock in the I/O card also includes a step of processing the directly impressed clock, either from the main board of the personal computer or from the graphic data processing circuit, to obtain the desired clock for the UART circuit with a desired frequency.

7 Claims, 6 Drawing Sheets

| DESIRED BAUD RATE | 16450 DECIMAL DIVISOR USED TO GENERATE 16/CLOCK | 14.31818M÷31×4 | | 1.8432M (STANDARD) | |
|---|---|---|---|---|---|
| | | BAUD RATE | FREQ. DISTORTION | BAUD RATE | FREQ. DISTORTION |
| 50 | 2304 | 50.117 | 0.23% | 50 | 0 |
| 75 | 1536 | 75.17 | 0.23% | 75 | 0 |
| 110 | 1047 | 110.289 | 0.26% | 110/03 | 0.026% |
| 134.5 | 857 | 134.736 | 0.175% | 134.42 | 0.058% |
| 150 | 768 | 150.351 | 0.23% | 150 | 0 |
| 300 | 384 | 300.701 | 0.23% | 300 | 0 |
| 600 | 192 | 601.402 | 0.23% | 600 | 0 |
| 1200 | 96 | 1202.804 | 0.23% | 1200 | 0 |
| 1800 | 64 | 1804.206 | 0.23% | 1800 | 0 |
| 2000 | 58 | 1990.848 | 0.46% | 1986.2 | 0.69% |
| 2400 | 48 | 2405.608 | 0.23% | 2400 | 0 |
| 3600 | 32 | 3608.412 | 0.23% | 3600 | 0 |
| 4800 | 24 | 4811.2164 | 0.23% | 4800 | 0 |
| 7200 | 16 | 7216.8246 | 0.23% | 7200 | 0 |
| 9600 | 12 | 9622.433 | 0.23% | 9600 | 0 |
| 19200 | 6 | 19244.866 | 0.23% | 19200 | 0 |
| 38400 | 3 | 8489.583 | 0.23% | 38400 | 0 |

FIG.7

| DESIRED BAUD RATE | 16450 DECIMAL DIVISOR USED TO GENERATE 16/CLOCK | 16MHz-26×3 ||
|---|---|---|---|
| | | BAUD RATE | BAUD RATE DISTORTION |
| 50 | 2304 | 50.08 | 0.16% |
| 75 | 1536 | 75.12 | 0.12% |
| 110 | 1047 | 110.20 | 0.19% |
| 134.5 | 857 | 134.64 | 0.27% |
| 150 | 768 | 150.24 | 0.16% |
| 300 | 384 | 300.48 | 0.16% |
| 600 | 192 | 600.96 | 0.16% |
| 1200 | 96 | 1201.92 | 0.16% |
| 1800 | 64 | 1802.88 | 0.16% |
| 2000 | 58 | 1989.39 | 0.53% |
| 2400 | 48 | 2403.84 | 0.16% |
| 3600 | 32 | 3605.76 | 0.16% |
| 4800 | 24 | 4807.68 | 0.16% |
| 7200 | 16 | 7211.52 | 0.16% |
| 9600 | 12 | 9615.36 | 0.16% |
| 19200 | 6 | 19230.73 | 0.16% |
| 38400 | 3 | 38461.46 | 0.16% |

FIG.8

METHOD OF ESTABLISHING A CLOCK IN THE I/O CARD OF A PERSONAL COMPUTER

This is a continuation of application Ser. No. 07/416,664, filed Oct. 3, 1989, now abandoned.

BACKGROUND OF THE INVENTION

The present invention relates to a method of establishing a clock in the I/O card of a personal computer and more particularly to a method of establishing a control clock in the UART of the I/O card of a personal computer.

Conventional I/O cards of a personal computer usually include a device for receiving data bits from the central processing unit and transmitting the same to the desired peripheral equipment. This circuit element, included in a standard I/O card, was first developed by Intel Inc. and is referred to as the Universal Asynchronized Receiver and Transmitter, commercially abbreviated as UART. A traditional I/O card of this type is schematically shown in FIG. 1. The I/O card 10 includes a UART circuit 11 which is operated at a frequency of 1.8432 MHz. This I/O card 10 is used with a PC/AT having a connection slot which provides a clock from the main board to the I/O card through the connectors 13 thereon. The clock of the main board operates at a frequency of 14.31818 MHz.

A conventional and typical combined graphic and I/O card is schematically shown in FIG. 2. The card 20 includes all the circuit elements of a standard I/O card represented by block 21 and operates according to a clock generated by the crystal 22 at a frequency of 1.8432 MHz. Another graphic data processing circuit 23 is also included in the card 20 and operated according to another clock generated by a second crystal 24 at a frequency of 16 MHz.

From the above described conventional I/O cards used in a PC/AT, an independent crystal has been used to generate a control clock for the UART circuit on the I/O card. For the purpose of reduction of the manufacturing cost of an interface I/O card and to same pin count, the crystals for the UART circuit can possibly be eliminated.

SUMMARY OF THE INVENTION

It is therefore the main object of the present invention to provide a method of establishing a clock in the I/O card of a personal computer without the need of an independent crystal.

The method of establishing a control clock in the I/O card of the present invention comprises a first step of directly impressing the clock from the main board of a personal computer on the I/O card thereof, a second step of processing the main board clock to achieve a desired clock for the UART circuit of the I/O card, and a third step of inputting the desired clock into the UART circuit of the I/O card.

In an alternative embodiment of the method of the present invention, the method comprises a first step of processing the clock from the graphic processing circuit to result in a desired clock for the UART circuit of the I/O card, and a second step of impressing the obtained clock on the UART circuit of the I/O card.

It is readily apparent that the advantage of the method according to the present invention is to save the cost of providing an independent crystal for the UART circuit. Besides, the resulted clock, obtained either from the main board clock or the control clock of the graphic processing circuit, is a desired clock having a frequency distortion of less then 0.5%.

The step of processing the clock either from the main board of the personal computer or from the graphic data processing circuit device, is achieved by a frequency dividing circuit means which will accurately result in desired clock for the UART circuit, which has a frequency of about 1.8432 MHz.

BRIEF DESCRIPTION OF THE DRAWINGS

These and other objects, features and advantages of the method according to the present invention will become apparent from the following detailed description of the preferred embodiment reference to the accompanying drawings.

FIG. 7 is a frequency distortion list of the clock for the UART circuit impressed on the I/O card which obtained from the clock of the main board of a personal computer.

FIG. 8 is a frequency distortion list of the processed clock for the UART circuit in the I/O card obtained from the clock of the graphic data processing circuit.

DETAILED DESCRIPTION OF THE PREFERRED EMBODIMENTS

Figure 1:
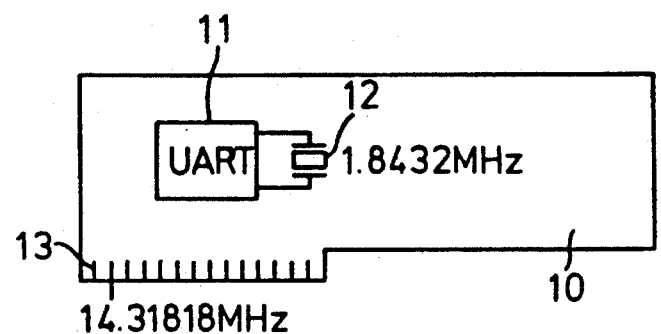
FIG. 1 is a schematic view of a standard I/0 card for a personal computer.
Figure 2:
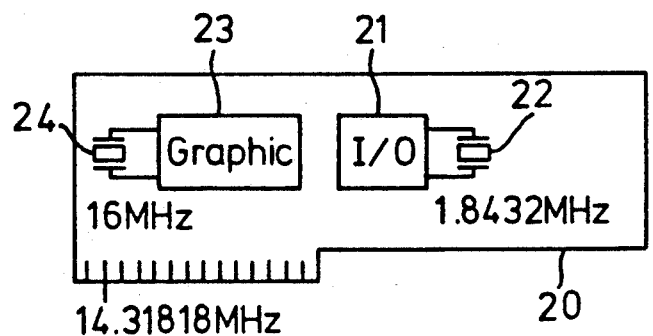
Fig. 2 is a schematic view of a conventional combined graphic card and I/O card for a personal computer.
Figure 3:
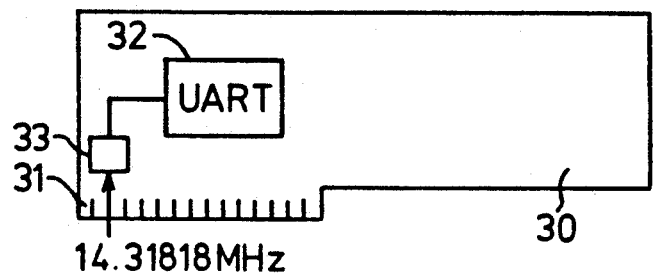
FIG. 3 is a schematic view of an I/O card impressed with a control clock for the UART circuit which was obtained from the clock of the main board of the personal computer according to the present invention.

Referring to FIG. 3 which shows a schematic view of an I/O card adopting the method of the present invention, the I/O card 30 includes a connector 31 to be inserted into the slot of the main board of a personal computer, a UART circuit 32 for receiving and transmitting data bits and a frequency dividing circuit device 33. The clock of the main board of the personal computer operates at a frequency of 14.31818 MHz which is fed through, the connector 31 to the frequency dividing circuit device 33.

Figure 4:
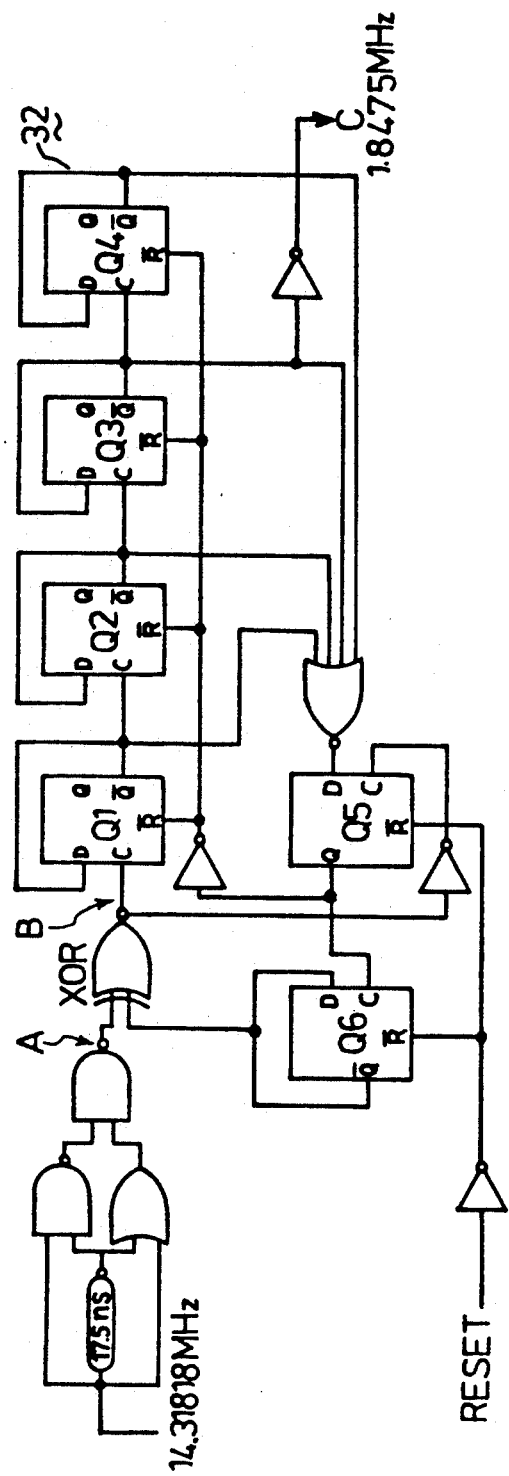
FIG. 4 is a circuit diagram of the frequency dividing circuit device used in the method of the present invention.
Figure 5:
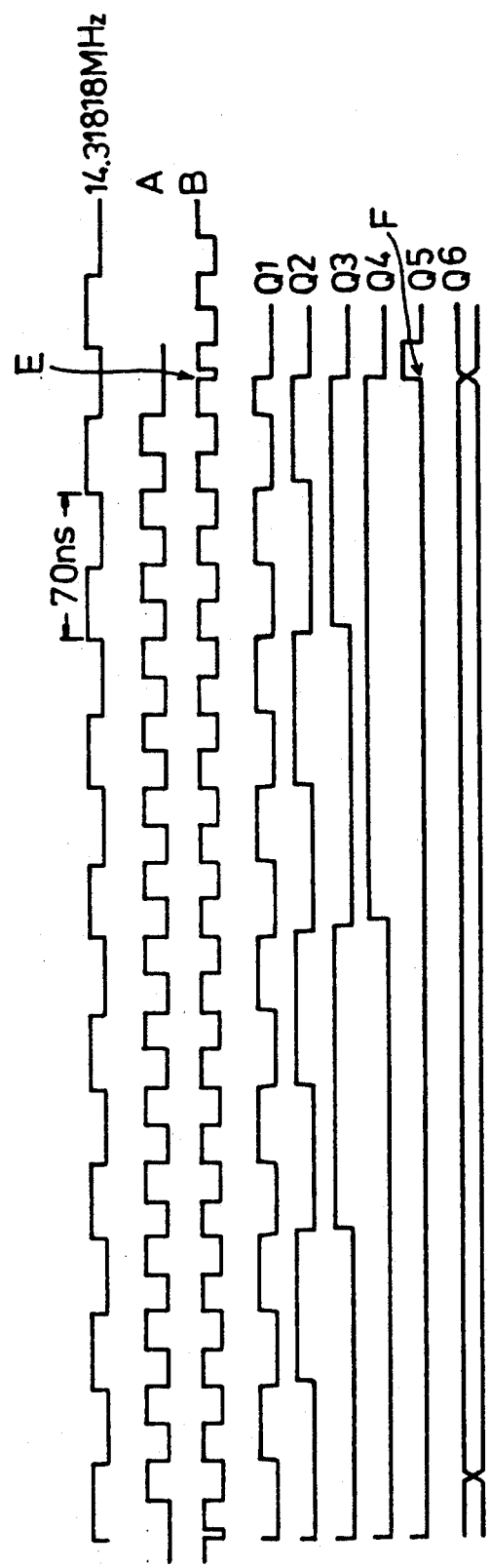
FIG. 5 is a wave form diagram of various junctions of the frequency dividing circuit device.

The actual circuit embodying the frequency dividing circuit device 33 is shown in FIG. 4. Referring to FIG. 4 with reference to FIG. 5 which is a wave form diagram showing various junctions in the circuit, the frequency dividing circuit device 33 functions as a frequency converting circuit. The impressed clock of the main board of a personal computer has a frequency of 14.31818 MHz which is processed by the frequency dividing circuit device 33 to result in a clock with a frequency of 1.8475 MHz. The impressed 14.31818 MHz is first multiplied to, result in a pulse signal at junction (A) with a frequency of 28.63636 MHz. The pulse signal at junction (A) is fed to an XOR gate which is controlled by the output of circuit Q6 to result in an inverse wave form at junction (B). Circuits Q1, Q2, Q3, Q4 which are standard frequency dividing circuits, each divide the original frequency by two. A fifth and sixth circuit Q5, Q6 form a latch circuit. Each time the fifth circuit Q5 counts to the 31th wave of the pulse signal on junction (B), as represented by the letters (E) and (F) shown in FIG. 5, all the standard frequency dividing circuits Q1 to Q4 will be reset and the pulse signal on junction (B) will be reversed. Therefore, the obtained output pulse signal at Junction (C) will have a frequency equal to 14.31818 MHz×2/15.5=1.8475 MHz.

Referring again to FIG. 3, the resulted clock signal with a frequency of 1.8475 MHz is input into the UART circuit 32. It is noted that the clock for a standard I/O card is designed to be 1.8432 MHz. Therefore, the frequency distortion will be 0.23%. The frequency distortions have been tested to determine various desired baud rates for the UART circuit 32. The frequency distortions are listed in the table shown in FIG. 7. It is concluded the tested frequency distortions are acceptable for the operation of the UART circuit 32.

Figure 6:
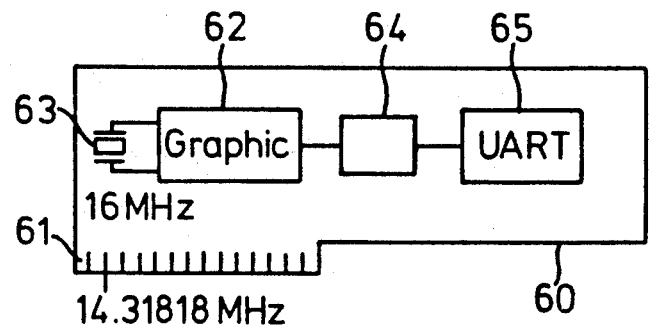
FIG. 6 is a schematic view of a combined graphic card and I/O card with a processed clock for the UART circuit obtained from the clock of the graphic data processing circuit according to the method of the present invention.

Another embodiment of the method of the present invention can be understood with reference to FIG. 6 which shows a schematic view of a combined graphic card and I/O card. The card 60 has a connector 61 to be connected to the main board of a personal computer, a graphic data processing circuit 62 operated according to the clock generated by the crystal 63, a frequency conversion circuit means represented by an empty square 64, and a UART circuit 65. The clock signal for the UART circuit 65 impressed on the combined graphic card and I/O card is obtained from the clock of the graphic data processing circuit device 62. It is known that the crystal 63 will generate a clock with a frequency of 16 MHz. The frequency conversion circuit device 64 will then convert the input 16 MHz signal into a clock for the UART circuit 65 with a frequency of 1.84615 MHz. The actual logic circuit for such a frequency conversion can be achieved by those skilled in the art to form a circuit which functions at a frequency of 16 MHz×3/26=1.84615 MHz. With such a circuit, the frequency distortion is 1.84618 MHz/1.8432 MHz=0.16%. The frequency distortions for various desired baud rates for the transmitting of data bits are listed in a table shown in FIG. 8.

Although the method of the present invention has been described by way of preferred embodiments, changes and modifications are still possible for those skilled in the art without departing from the spirit of the present invention.

We claim:

1. A method for electrically impressing a clock signal on a UART circuit in an I/O card used in a personal computer which has a main board clock that is operable to generate an output with a frequency of approximately 14.31818 MHz, said method comprising the steps of:
   impressing the output of said main board clock on said I/O card;
   dividing the frequency of the output of said main board clock by $3\frac{1}{4}$ so as to obtain a controlled clock signal with a frequency of approximately 1.8475 MHz, said step of dividing the frequency of the output of said main board clock including steps of:
   (a) delivering said output of said main board clock to a first input of a first NAND gate and a first input of an OR gate,
   (b) delaying and then delivering said output of said main board clock to a second input of said first NAND gate and a second input of said OR gate,
   (c) delivering an output of said first NAND gate and an output of said OR gate to an exclusive OR gate,
   (d) delivering an output of said exclusive OR gate to a plurality of flip-flops which are connected in series,
   (e) delivering an output of each of said flip-flops to a latch circuit, and
   (f) delivering an output from said latch circuit to said exclusive OR gate and said plurality of flip-flops; and
   inputting said controlled clock signal into said UART circuit in said I/O card;
   thereby eliminating a use of an independent clock crystal for said UART circuit in said I/O card.

2. The method of claim 1, wherein said step of delivering the output of each of said flip-flops to a latch circuit comprises a step of delivering the output of said plurality of flip-flops to a NOR gate electrically communicating with said latch circuit.

3. The method of claim 1, wherein said step of delaying and then delivering said output of said main board clock includes a step of delaying the output of said main board clock by approximately 17.5 ns.

4. The method of claim 1, wherein said step of delivering the output of said first NAND gate and the output of said OR gate to the exclusive OR gate further comprises a step of delivering the output of said first NAND gate and the output of said OR gate to a second NAND gate, said second NAND gate being in electrical communication with said exclusive OR gate.

5. A method for electrically impressing a clock signal on a UART circuit in a card used in a personal computer, said card having a clock that is operable to generate an output with a frequency of approximately 16 MHz, said method comprising steps of:
   dividing the frequency of the output of said clock by 2 6/3 so as to obtain a controlled clock signal with a frequency of approximately 1.8432 MHz, said step of dividing the frequency of the output of said clock including steps of:
   (a) delivering said output of said clock to a first input of a first NAND gate and a first input of an OR gate,
   (b) delaying and then delivering said output of said clock to a second input of said first NAND gate and a second input of said OR gate,
   (c) delivering an output of said first NAND gate and an output of said OR gate to an exclusive OR gate,
   (d) delivering an output of said exclusive OR gate to a plurality of flip-flops which are connected in series,
   (e) delivering an output of each of said flip-flops to a latch circuit, and
   (f) delivering an output from said latch circuit to said exclusive OR gate and said plurality of flip-flops; and
   inputting said controlled clock signal into said UART circuit in said card;
   thereby eliminating a use of an independent clock crystal for said UART circuit in said card.

6. The method of claim 5, wherein said step of delivering the output of each of said flip-flops to said latch circuit comprise a step of delivering the output of said plurality of flip-flops to a NOR gate electrically communicating with said latch circuit.

7. The method of claim 5, wherein said step of delivering the output of said first NAND gate and the output of said OR gate to the exclusive OR gate further comprises a step of delivering the output of said first NAND gate and the output of said OR gate to a second NAND gate, said second NAND gate being in electrical communication with said exclusive OR gate.

* * * * *

UNITED STATES PATENT AND TRADEMARK OFFICE
CERTIFICATE OF CORRECTION

PATENT NO. : 5,241,647
DATED : August 31, 1993
INVENTOR(S) : James J. Y. Lin et al It is certified that error appears in the above-identified patent and that said Letters Patent is hereby corrected as shown below:

Column 2, line 17, "I/0" should be --I/O--.

Column 2, line 19, "Flg." should be --FIG.--.

Column 2, line 53, delete ",".

Column 2, line 65, delete ",".

Column 3, line 62, Claim 1, "$3\frac{1}{4}$" should be -- $\frac{31}{4}$ --.

Column 4, line 41, Claim 5, "2 6/3" should be -- $\frac{26}{3}$ --.

Column 4, line 68, Claim 6, "comprise" should be --comprises--.

Signed and Sealed this

Fifth Day of July, 1994

Attest:

BRUCE LEHMAN

*Attesting Officer*  *Commissioner of Patents and Trademarks*